(12) United States Patent
Kuroda et al.

(10) Patent No.: US 11,208,834 B2
(45) Date of Patent: Dec. 28, 2021

(54) POWER SLIDE WINDOW

(71) Applicant: Yachiyo Industry Co., Ltd., Saitama (JP)

(72) Inventors: Atsushi Kuroda, Tochigi (JP);
Teruyuki Nakamura, Tochigi (JP);
Hirotaka Kamioka, Tochigi (JP);
Keiichiro Nakamura, Tochigi (JP)

(73) Assignee: Yachiyo Industry Co., Ltd., Sayama (JP)

( * ) Notice: Subject to any disclaimer, the term of this patent is extended or adjusted under 35 U.S.C. 154(b) by 0 days.

(21) Appl. No.: 17/261,607

(22) PCT Filed: Jul. 12, 2019

(86) PCT No.: PCT/JP2019/027726
§ 371 (c)(1),
(2) Date: Jan. 20, 2021

(87) PCT Pub. No.: WO2020/026769
PCT Pub. Date: Feb. 6, 2020

(65) Prior Publication Data
US 2021/0254383 A1    Aug. 19, 2021

(30) Foreign Application Priority Data

Jul. 31, 2018    (JP) .............................. JP2018-143175
Sep. 11, 2018    (JP) .............................. JP2018-169554

(51) Int. Cl.
*E06B 1/00*    (2006.01)
*E05D 15/06*    (2006.01)
(Continued)

(52) U.S. Cl.
CPC .......... *E05D 15/066* (2013.01); *B60J 1/1853* (2013.01); *E05F 5/003* (2013.01); *E05F 15/60* (2015.01); *E05Y 2900/55* (2013.01)

(58) Field of Classification Search
CPC ....... E05D 15/066; B60J 1/1853; E05F 5/003; E05F 15/60; E05Y 2900/55
(Continued)

(56) References Cited

U.S. PATENT DOCUMENTS 5,822,922 A * 10/1998 Grumm .................. B60J 1/1853
49/360
5,839,231 A * 11/1998 Gebhart ................. B60J 1/1853
49/413

(Continued)

FOREIGN PATENT DOCUMENTS

JP    2011202414    10/2011
KR    101532063    6/2015
(Continued)

OTHER PUBLICATIONS

International Search Report for PCT/JP2019/027726 dated Aug. 27, 2019, 1 page.
(Continued)

*Primary Examiner* — Jerry E Redman
(74) *Attorney, Agent, or Firm* — Dority & Manning, P.A.

(57) ABSTRACT

To provide a power slide window in which, irrespective of the assembly accuracy, the step between the slide panel and the window glass pane in the closed state can be reduced, at least one pin drive groove (30) formed in a slider (20) to engage at least one pin (16) extends in a direction crossing a panel surface (2b) of the window glass pane (2) and inclined to the direction of extension of a groove main portion (26a) of a pin guide groove (26). A stopper (23) configured to limit the movement of the slider (20) toward the closed position is provided in a slider guide groove (27), and a position adjustment structure (32) capable of adjusting the position of the stopper (23) in the direction of extension of the slider guide groove (27) is provided. By adjusting the position of the stopper (23) by the position adjustment
(Continued)

structure (32), it is possible to limit the movement of the slider (20) toward the closed position at a position where the slide panel (3) aligns with the window glass pane (2).

4 Claims, 10 Drawing Sheets

(51) Int. Cl.
 *E05F 15/60* (2015.01)
 *B60J 1/18* (2006.01)
 *E05F 5/00* (2017.01)
(58) Field of Classification Search
 USPC .......................................... 49/380, 213, 413
 See application file for complete search history.

(56) References Cited

U.S. PATENT DOCUMENTS

| | | | |
|---|---|---|---|
| 7,568,312 B2 * | 8/2009 | Dufour | B60J 1/1853 49/216 |
| 8,769,872 B2 * | 7/2014 | Maltaverne | B60J 1/16 49/209 |
| 8,813,425 B2 * | 8/2014 | Ash, Jr. | E05F 15/646 49/380 |
| 8,881,458 B2 * | 11/2014 | Snider | E05B 83/00 49/380 |
| 10,266,037 B2 * | 4/2019 | Hulst | B60J 1/1853 |
| 2011/0232197 A1 | 9/2011 | Suzuki et al. | |
| 2016/0208536 A1 * | 7/2016 | Gipson | E05D 15/0621 |

FOREIGN PATENT DOCUMENTS

| | | |
|---|---|---|
| WO | WO2018/047476 | 3/2018 |
| WO | WO201847614 | 3/2018 |

OTHER PUBLICATIONS

International Preliminary Report on Patentability for PCT/JP2019/027726, 3 pages.
Revised extended European Search Report for corresponding EP Application No. 19844675.9, dated Nov. 11, 2021—12 pages.

* cited by examiner (A)

(B)

(C)

(A)

(B)

POWER SLIDE WINDOW

CROSS REFERENCE TO RELATED APPLICATIONS

This application is the U.S. National Stage entry of International Application No. PCT/JP2019/027726 filed under the Patent Cooperation Treaty having a filing date of Jul. 12, 2019, which claims priority to Japanese Patent Application No. 2018-143175 having a filing date of Jul. 31, 2018 and Japanese Patent Application No. 2018-169554 having a filing date of Sep. 11, 2018, each of which is incorporated herein by reference.

TECHNICAL FIELD

The present disclosure relates to a power slide window for selectively closing an opening formed in a window glass pane with a slide panel that can be slidably driven by a drive source.

BACKGROUND ART

A power slide window for smoothly opening and closing an opening formed in a window glass pane with a slide panel slidingly driven in a direction along the panel surface of the window glass pane and a direction crossing the panel surface has been proposed by the applicant of the present application (Patent Document 1). In the power slide window described in Patent Document 1, a guide rail is provided along the panel surface of the window glass pane. The guide rail is formed with a slider guide groove for guiding a slider slidingly driven by a drive source and a pin guide groove for guiding a pin provided on the slide panel. The slider guide groove extends along the panel surface in the opening and closing direction. The pin guide groove includes a groove main portion extending along the panel surface in the opening and closing direction and a groove extension portion extending from the groove main portion in a direction to approach the panel surface of the window glass pane. The slider is formed with a pin drive groove extending in a direction crossing the panel surface, and the pin is passed through the pin drive groove to project into the pin guide groove. When the slider is driven along the slider guide groove, the pin driven via the pin drive groove moves in the pin guide groove. The slide panel moves in a direction toward and away from the window glass pane when the pin moves in the groove extension portion, and moves along the panel surface at a position spaced from the window glass pane when the pin moves in the groove main portion.

PRIOR ART DOCUMENT(S)

Patent Document(s)

Patent Document 1: WO2018/047614A1

SUMMARY OF THE INVENTION

Task to be Accomplished by the Invention

Incidentally, in the power slide window described in Patent Document 1, a portion of the pin drive groove on the side of the slide panel, that is, a portion of the pin drive groove on the side of the extension end of the groove extension portion in which the pin is located when the slide panel is in the closed position, extends in parallel with the groove main portion. When the slide panel is driven to the closed position, this configuration functions to retain the slide panel in the closed position so long as the pin is in the parallel portion, even if the slider is not stopped at an exact position.

However, the main groove portion may not be properly positioned relative to the window glass pane when assembling the guide rail or the pin may not be properly positioned relative to the slide panel when assembling the pin. In such cases, a step is created between the slide panel located in the closed position and the window glass pane, which deteriorates the appearance and commercial value of the power slide window.

In view of such background, an object of the present invention is to provide a power slide window which, irrespective of the assembly accuracy, can reduce the step between the slide panel and the window glass pane in the closed state.

Means to Accomplish the Task

To achieve such an object, one embodiment of the present invention provides a power slide window (1) for opening and closing an opening (2a) provided in a window glass pane (2) with a slide panel (3), the power slide window comprising: a guide rail (4) provided on the window glass pane along a panel surface of the window glass pane; at least one pin (16) projecting from the slide panel along the panel surface in a direction crossing a longitudinal direction of the guide rail; a pin guide groove (26) formed in the guide rail to receive the at least one pin, the pin guide groove including a groove main portion (26a) extending along the panel surface in the opening and closing direction and at least one groove extension portion (26b) extending from the groove main portion to drive the slide panel in a direction to approach the window glass pane via the at least one pin when the slide panel reaches a vicinity of a closed position; a slider (20) slidably provided in a slider guide groove (27) formed in the guide rail and slidingly driven by a drive source (5) in the opening and closing direction; at least one pin drive groove (30) that is formed in the slider to engage the at least one pin and extends in a direction crossing the panel surface and inclined to a direction of extension of the groove main portion; a stopper (23) provided in the slider guide groove to limit a movement of the slider toward the closed position; and a position adjustment structure (32) capable of adjusting a position of the stopper in a direction of extension of the slider guide groove.

According to this configuration, when the slider is slidingly driven, the slide panel moves toward and away from the window glass pane as the pin driven by the pin drive groove moves in the groove extension portion, and slides in the opening and closing direction as the pin moves in the groove main portion. Further, since the pin drive groove extends in a direction inclined to the direction of extension of the groove main portion and the stopper is configured to be position-adjustable by the position adjustment structure, it is possible to limit the movement of the slider toward the closed position at a position where the slide panel aligns with the window glass pane. Thereby, irrespective of the assembly accuracy, it is possible to reduce the step between the slide panel and the window glass pane in the closed state.

Preferably, in the above configuration, the position adjustment structure (32) includes at least one engagement recess (33) formed on a side surface of one of the slider guide groove (27) and the stopper (23) at a prescribed interval in the longitudinal direction of the guide rail and at least one engagement protrusion (34) formed on a side surface of the other of the slider guide groove and the stopper to engage the engagement recess, and is configured to be capable of attaching the stopper to the guide rail at multiple different positions in the direction of extension of the slider guide groove by engagement between the engagement recess and the engagement protrusion.

According to this configuration, the position adjustment structure can be constituted easily, and in addition, the position of the stopper can be readily adjusted by removing and inserting the stopper from and into the slider guide groove. Also, the engagement recess and the engagement protrusion are formed on the side surface of the slider guide groove or the stopper, inadvertent move of the stopper in the slider guide groove can be suppressed.

Effect of the Invention

Thus, according to the present invention, it is possible to provide a power slide window which, irrespective of the assembly accuracy, can reduce the step between the slide panel and the window glass pane in the closed state.

MODES FOR CARRYING OUT THE INVENTION

A preferred embodiment of the present invention is described in the following with reference to the appended drawings. The fore and aft, and up and down directions mentioned in the following description are based on the state where the power slide window 1 is mounted on a vehicle, and the right and left directions are based on the view point of a vehicle occupant viewing the power slide window 1 rearward from a front part of the cabin of the vehicle. The front and rear sides may be referred to as inboard side and outboard side with respect to the cabin. The similar components which are arranged in laterally opposing pairs are denoted with numerals with a different suffix R or L appended thereto depending on if the particular component is located in a right part or in a left part. When such components are collectively referred to or when no distinction is required if the particular component is located in an upper part or a lower part, or on a left hand side or a right hand side, the suffix is omitted from the numeral indicating each particular component.

Figure 1:
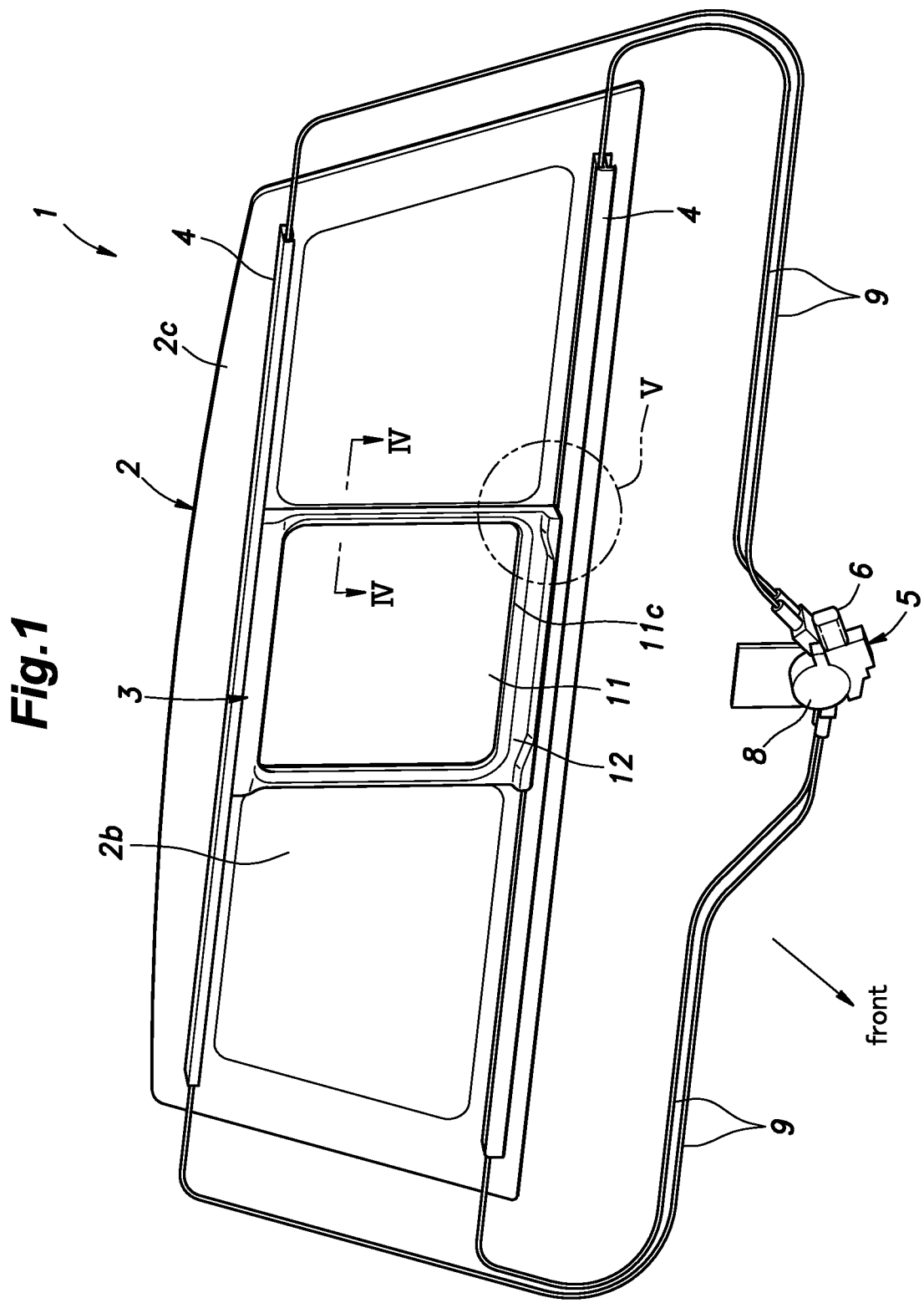
FIG. 1 is a perspective view of an overall structure of a power slide window according to an embodiment of the present invention in a closed state.

FIG. 1 is a perspective view of an overall structure of a power slide window 1 for a vehicle according to an embodiment of the present invention in a closed state as viewed from an upper front part of a passenger compartment of the vehicle. This power slide window 1 is fitted on a rear end of a cabin of a pickup truck as a rear window, and includes a window glass pane 2. The window glass pane 2 extends substantially vertically with the major plane thereof facing in a fore and aft direction, and is provided with a laterally elongated substantially rectangular shape such that the lateral dimension along the major plane is greater than the vertical dimension along the panel surface. The window glass pane 2 is slightly curved along the right and left edges and the upper and lower edges thereof so as to be convex toward the rear.

A rectangular opening 2a (FIG. 2) is formed in a central part of the window glass pane 2, and a rectangular slide panel 3 is provided on the window glass pane 2 so as to close the opening 2a. The outer periphery and the inner periphery around the opening 2a of the window glass pane 2 are formed with light shielding portions 2c on the front surface thereof (which will be referred to as panel surface 2b) by applying a light shielding treatment or by applying a paint containing black pigment (black ceramic coating).

An upper and lower guide rail 4 extending laterally and horizontally in parallel to each other along the panel surface 2b are attached to the corresponding light shielding portions 2c of the window glass pane 2. In particular, the slide panel 3 is configured to be slidable in the lateral direction along the upper and lower guide rails 4.

Figure 2:
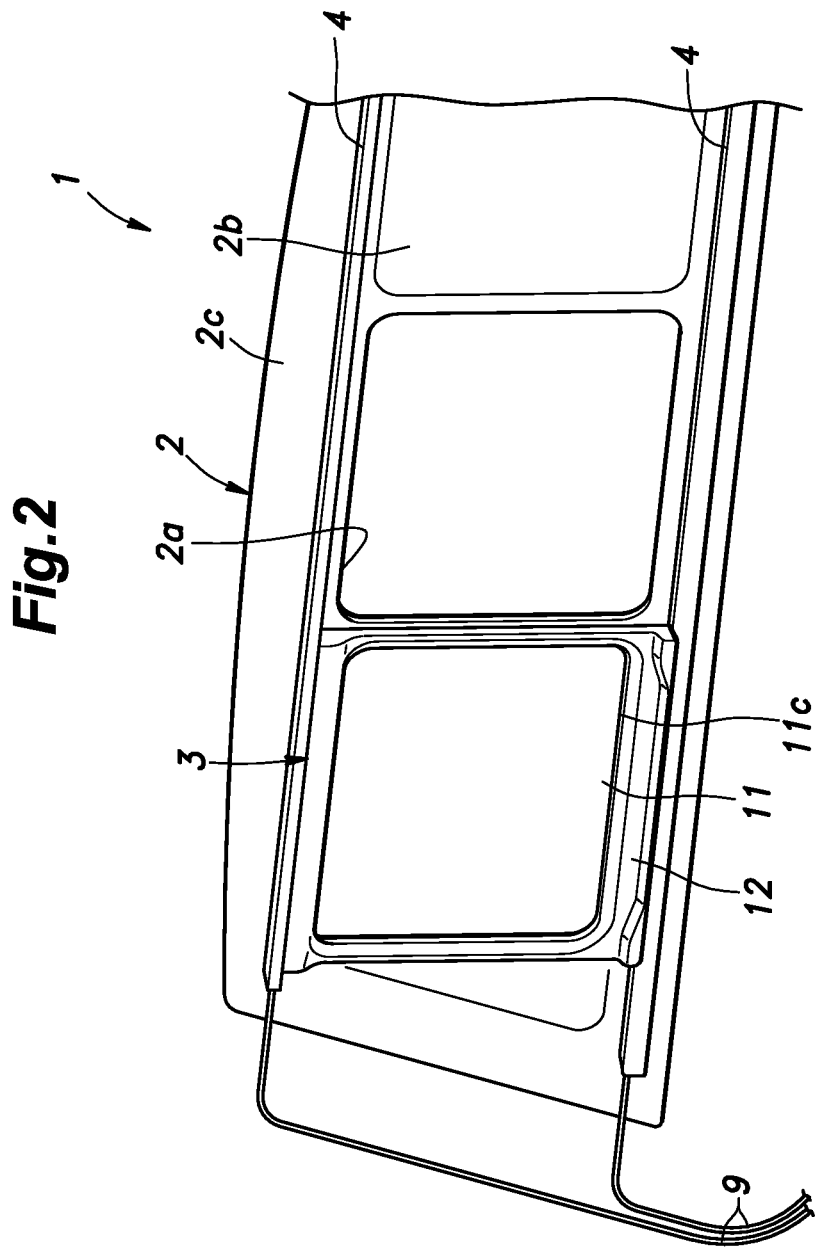
FIG. 2 is a fragmentary perspective view of the power slide window shown in FIG. 1 in an open state.

In the present embodiment, the slide panel 3 is configured to selectively open and close the opening 2a by sliding between a closed position in which the opening 2a is closed as shown in FIG. 1, and an open position in which the opening 2a is opened by sliding from the closed position to the left as shown in FIG. 2. The slide panel 3 in the closed position is positioned in a more forward position (inboard side of the window glass pane 2) than in the open position.

In an alternate embodiment, the slide panel 3 opens only a part of the opening 2a in the open position. In another alternate embodiment, the slide panel 3 is configured to slide to the right from the closed position to open the opening 2a. It is also possible to arrange such that the slide panel 3 is slidable in either lateral direction from the closed position thereof so that the opening 2a may be opened by sliding the slide panel 3 in either lateral direction from the closed position. Also, the slide panel 3 in the closed position may be positioned in a more rearward position (outboard side of the window glass pane 2) than in the open position.

As shown in FIG. 1, a drive source 5 for slidingly driving the slide panel 3 is provided in a part of the vehicle body located under the window glass pane 2. The drive source 5 includes an electric motor 6, a speed reduction mechanism, and a housing 8 that houses the speed reduction mechanism, and is fixedly attached to the vehicle body via the housing 8. Four guide pipes 9 are connected to the housing 8. The two guide pipes 9 located on the right side extend rightward from the housing 8, and are then curved upward before being connected to the upper and lower guide rails 4, respectively, from the right side. The two guide pipes 9 located on the left side extend leftward from the housing 8, and are then curved upward before being connected to the upper and lower guide rails 4, respectively, from the left side.

The two guide pipes 9 connected to the upper guide rail 4 are connected to a relatively front part of the housing 8, and the two guide pipes 9 connected to the lower guide rail 4 are connected to a relatively rear part of the housing 8. The guide pipes 9 slidably receive therein cables 10 (see FIG. 3) for slidingly driving the slide panel 3 by transmitting the drive force of the drive source 5.

The upper cable 10 on the right side and the upper cable 10 on the left side are complementarily wound and unwound (or paid out) by a common pulley having a rotational center line extending in the fore and aft direction. Similarly, the lower cable 10 on the right side and the lower cable 10 on the left side are complementarily wound and unwound (or paid out) by another common pulley. These two pulleys are integrally combined to each other such that the right and left upper cables 10 and the right and left lower cables 10 are wound and unwound by the two pulleys of the drive source 5 in synchronism. These cables serve as a power transmission means for transmitting the drive force of the drive source 5 to the slide panel 3 (via sliders 20 to be more precise as will be described hereinafter).

Figure 3:
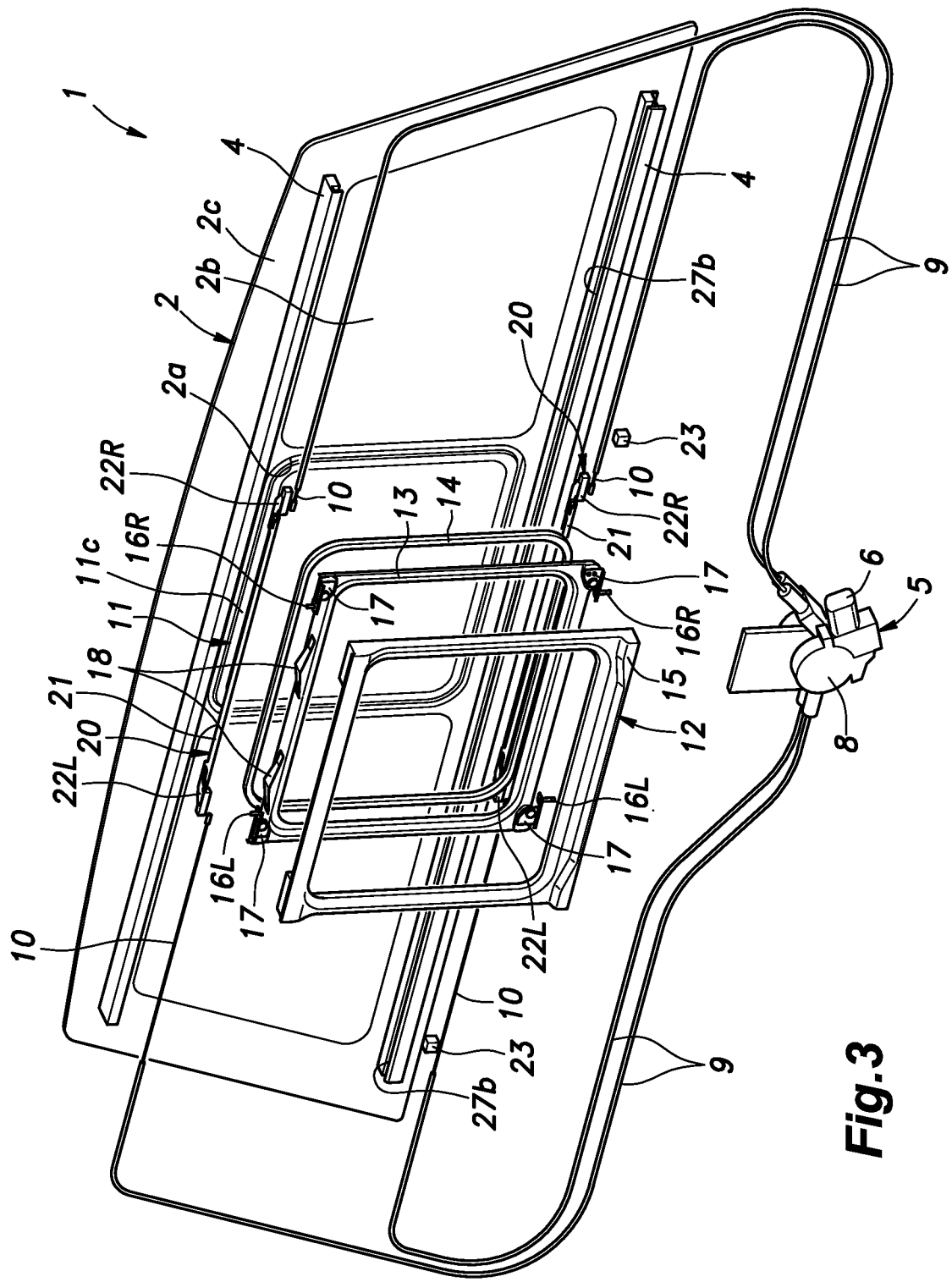
FIG. 3 is an exploded perspective view of the power slide window shown in FIG. 1.
Figure 4:
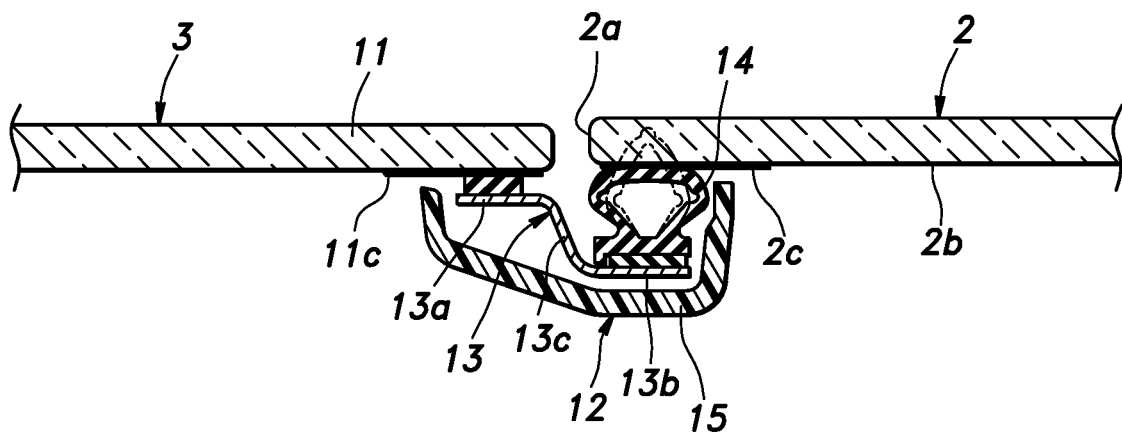
FIG. 4 is a sectional view taken along line IV-IV of FIG. 1.

FIG. 3 is an exploded perspective view of the power slide window 1 shown in FIG. 1. FIG. 4 is a sectional view taken along line IV-IV of FIG. 1. As shown in FIGS. 3 and 4, the slide panel 3 includes a movable glass pane 11 having the same thickness as the window glass pane 2, and a frame 12 provided on the periphery of the movable glass pane 11. The movable glass pane 11 is formed somewhat smaller than the opening 2a of the window glass pane 2, and is arranged parallel to the window glass pane 2 in the opening 2a so as to be flush with the window glass pane 2. The periphery of the movable glass pane 11 is formed with a light shielding portion 11c by applying a light shielding treatment or by applying of a paint containing black pigment (black ceramic coating).

The frame 12 includes a bracket frame 13 joined to the inner surface of the light shielding portion 11c of the movable glass pane 11 via an adhesive. The bracket frame 13 is provided with a rectangular annular shape having an inner contour smaller than the outer contour of the movable glass pane 11 and an outer contour larger than the outer contour of the movable glass pane 11. As shown in FIG. 4, the bracket frame 13 includes an inner portion 13a opposing the movable glass pane 11 at a position relatively close to the inner surface of the movable glass pane 11, and an outer portion 13b opposing the window glass pane 2 (which is flush with the inner surface of the movable glass pane 11) at a position relatively remote from the inner surface of the window glass pane 2, and an intermediate portion 13c connecting the inner portion 13a and the outer portion 13b with each other. Thus, the bracket frame 13 is provided with a crank-shaped cross section.

An annular seal member 14 having a hollow cross-sectional shape is attached to the rear surface of the outer portion 13b of the bracket frame 13 by using an adhesive agent. The seal member 14 is made of an elastic material having a low elastic modulus such as synthetic rubber. When no external force is applied, the seal member 14 has a height greater than the distance from the bracket frame 13 to the inner surface of the window glass pane 2 as shown by the imaginary line in FIG. 4. When the movable glass pane 11 is flush with the window glass pane 2, the seal member 14 is elastically deformed so as to reduce its height as indicated by the solid line in FIG. 3, and the distal end thereof resiliently abuts the inner surface of the window glass pane 2. Thereby, the sealing between the movable glass pane 11 and the window glass pane 2 is ensured.

A front side of the bracket frame 13 is fitted with an annular cover frame 15 that covers the seal member 14 and the bracket frame 13. The cover frame 15 is fixed to the bracket frame 13 at appropriate positions thereof. Thus, the frame 12 including the bracket frame 13, the seal member 14 and the cover frame 15 is provided on the front side (cabin side) of the movable glass pane 11, and extends over the light shielding portion 11c of the movable glass pane 11 and the light shielding portion 2c of the window glass pane 2. As a result, the gap between the peripheral edge of the movable glass pane 11 and the opening edge of the window glass pane 2 is covered by the frame 12 from the cabin side over the entire periphery.

As shown in FIG. 3, left and right end portions of an upper part of the bracket frame 13 are integrally provided with left and right upper pins 16 (16L, 16R), respectively, via pin brackets 17. The upper pins 16 project upward (namely, in a direction crossing the opening and closing direction of the slide panel 3 along the panel surface 2b of the window glass pane 2). Left and right end portions of a lower part of the bracket frame 13 are integrally provided with left and right downward-projecting lower pins 16 (16L, 16R), respectively, via pin brackets 17. The upper right pin 16R on the closing direction side is formed longer than the upper left pin 16L on the opening direction side, and the lower right pin 16R is formed longer than the lower left pin 16L. Further, a pair of upward-projecting leaf springs 18 are provided on the upper surface of the upper part of the bracket frame 13. The leaf springs 18 resiliently contact the lower surface of the upper guide rail 4 to urge the bracket frame 13 downward, and slide along the lower surface of the upper guide rail 4 as the bracket frame 13 slides.

An upper slider 20 is slidably provided in the upper guide rail 4 and a lower slider 20 is slidably provided in the lower guide rail 4. Each slider 20 includes a main plate member 21 which is made of metal and extends along mutually opposing surfaces of the upper and lower guide rails 4 and left and right sliding members 22 (22L, 22R) which are made of resin and are attached to the left and right end portions of the main plate member 21 so as to slidably contact the corresponding guide rail 4.

Each sliding member 22 is connected to the end portion of the corresponding one of the four cables 10 for slidingly driving the slide panel 3. Thereby, the drive force (tensile force) of the drive source 5 is transmitted to the upper slider 20 and the lower slider 20. The main plate member 21 is engaged by the left and right pins 16 on the corresponding upper or lower side. Namely, the slide panel 3 is supported by the upper slider 20 and the lower slider 20 via the left and right upper pins 16 and the left and right lower pins 16. The four cables 10 are connected to the left and right end portions of the upper part and the lower part of the slide panel 3 via the upper slider 20 and the lower slider 20, and transmit the drive force of the drive source 5 to the slide panel 3 via the upper slider 20 and the lower slider 20.

In another embodiment, push-pull cables may be used as the power transmission means to be coupled with one of the left and right sliding members 22L, 22R on the upper side and one of the left and right sliding members 22L, 22R on the lower side, respectively. In this case, the upper and lower push-pull cables may be provided to extend from the upper and lower sliders 20 in only one direction (leftward or rightward). Alternatively, the upper and lower push-pull cables may be provided to extend in one direction from the upper slider 20 and to extend in the other direction from the lower slider 20.

In left portions of the upper and lower guide rails 4, two left stoppers 23 are provided (only the lower one is shown in the drawings) such that, when the slide panel 3 moves leftward, the left stoppers 23 limit the movement of the slide panel 3 at the open position by contacting against the left ends of the corresponding upper and lower sliders 20. Further, in right portions of the upper and lower guide rails 4, two right stoppers 23 are provided (only the lower one is shown in the drawings) such that, when the slide panel 3 moves rightward, the right stoppers 23 limit the movement of the slide panel 3 at the closed position by contacting against the right ends of the corresponding upper and lower sliders 20. Each stopper 23 is provided with an elastic member at least on a contact surface thereof.

The connecting structure between the lower left cable 10 and the slide panel 3 via the slider 20 differs from the connecting structure between the lower right cable 10 and the slide panel 3 via the slider 20 only in that the directions in which the cables 10 extend are opposite to each other, but otherwise the same. The connecting structure between each lower cable 10 and the slide panel 3 via the slider 20 differs from the connecting structure between each upper cable 10 via the slider only in that the connecting structures are vertically symmetrical with respect to a horizontal plane, but otherwise the same. Therefore, as a representative of the connecting structures for the cables 10, the connecting structure between the lower right cable 10 and the slide panel 3 will be described. The term "lower" is omitted in the following description.

Figure 5:
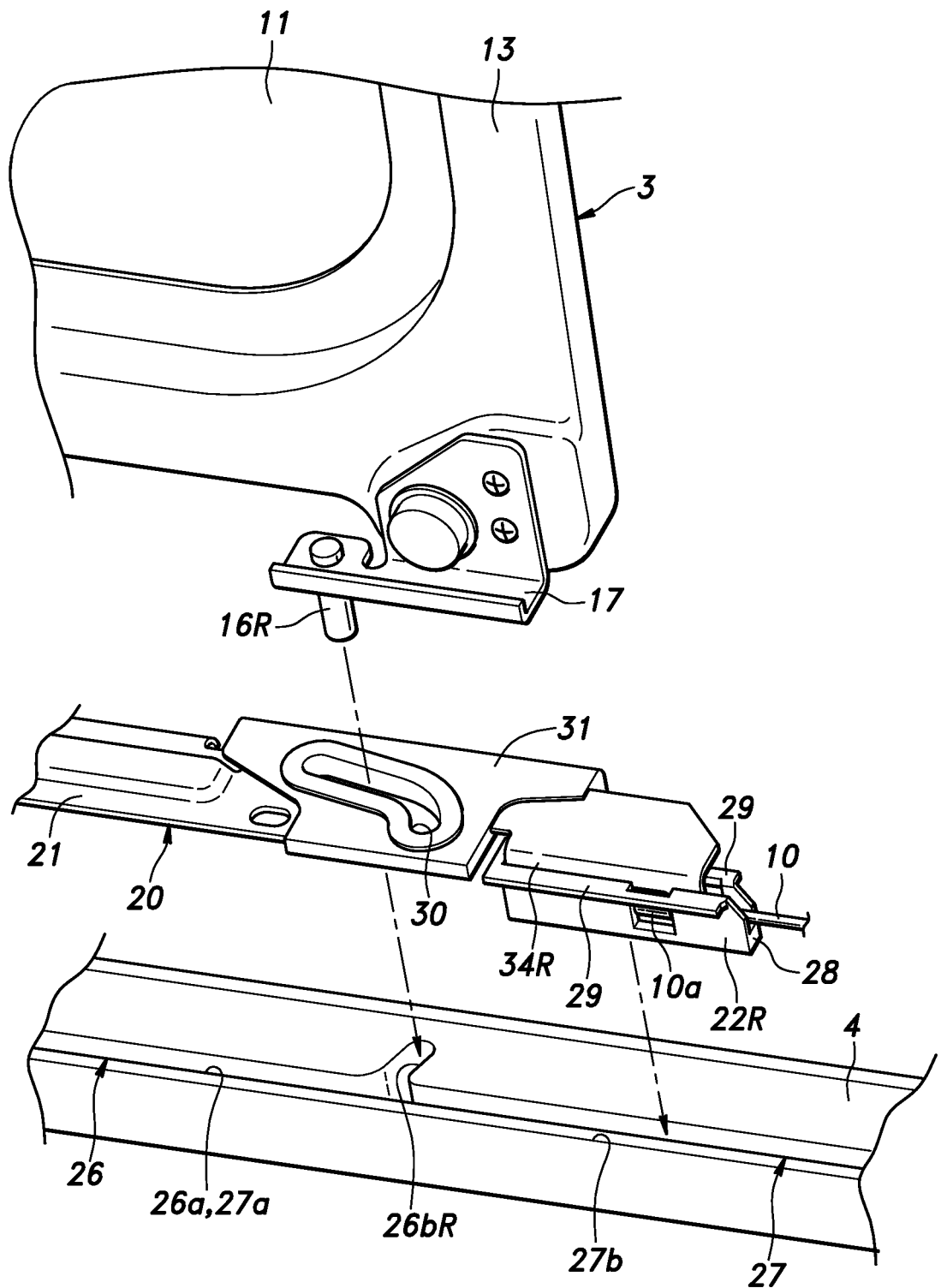
FIG. 5 is an exploded view of a part indicated by V in FIG. 1.
Figure 6:
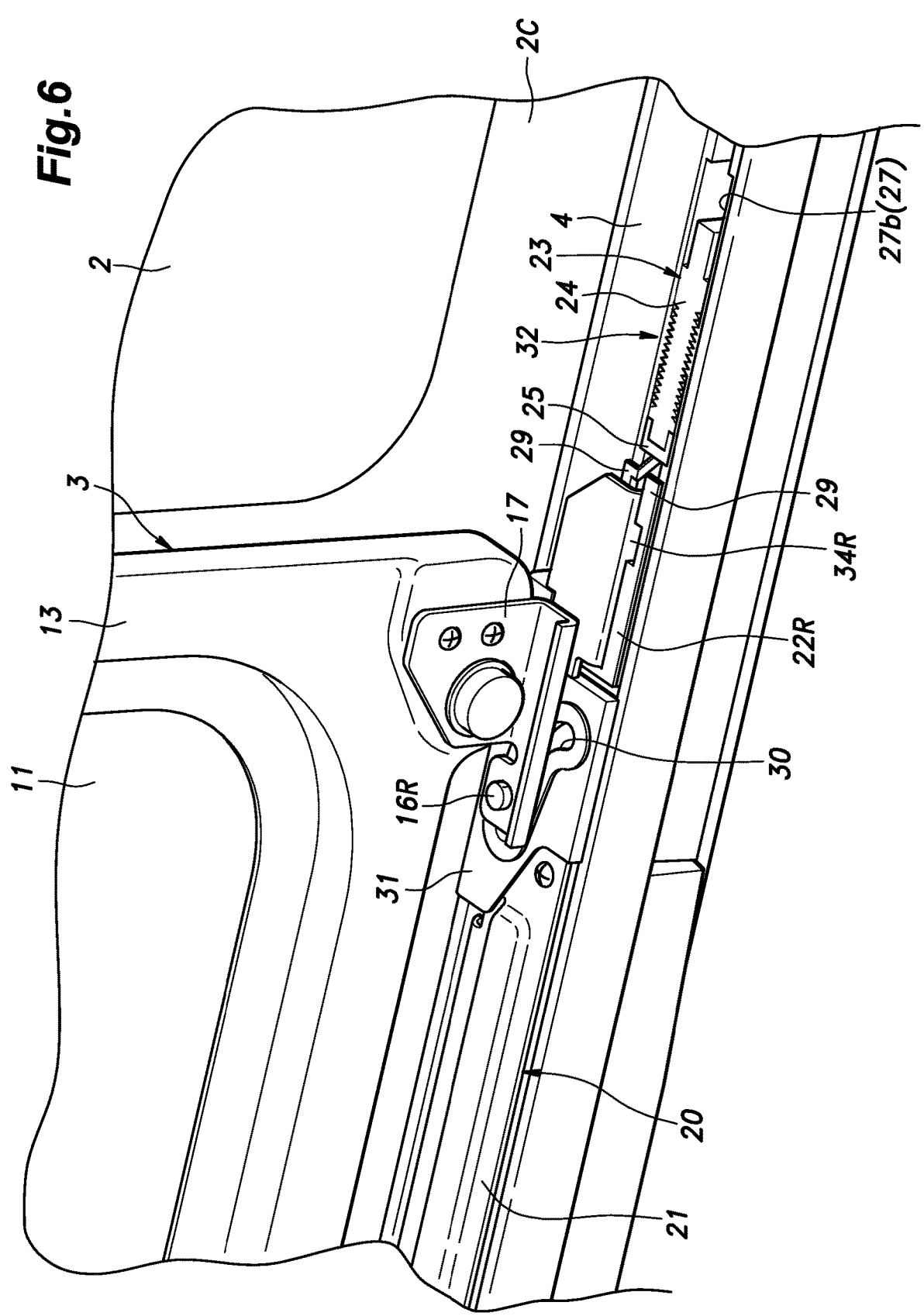
FIG. 6 is an enlarged view of the part indicated by V in FIG. 1.
Figure 7:
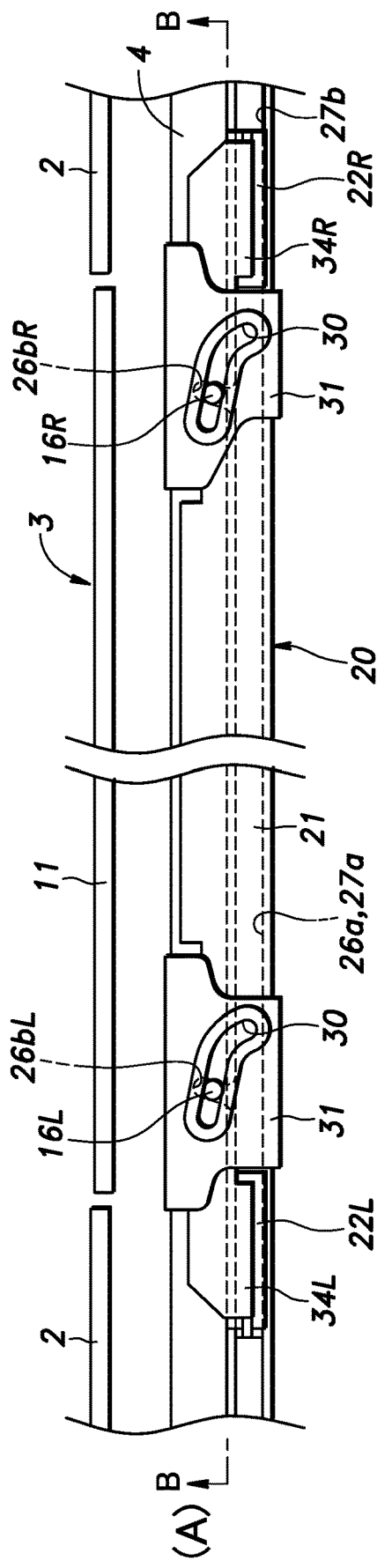
FIG. 7 shows (A) a sectional plan view and (B) a sectional vertical view of the power slide window in the closed state.
Figure 7:
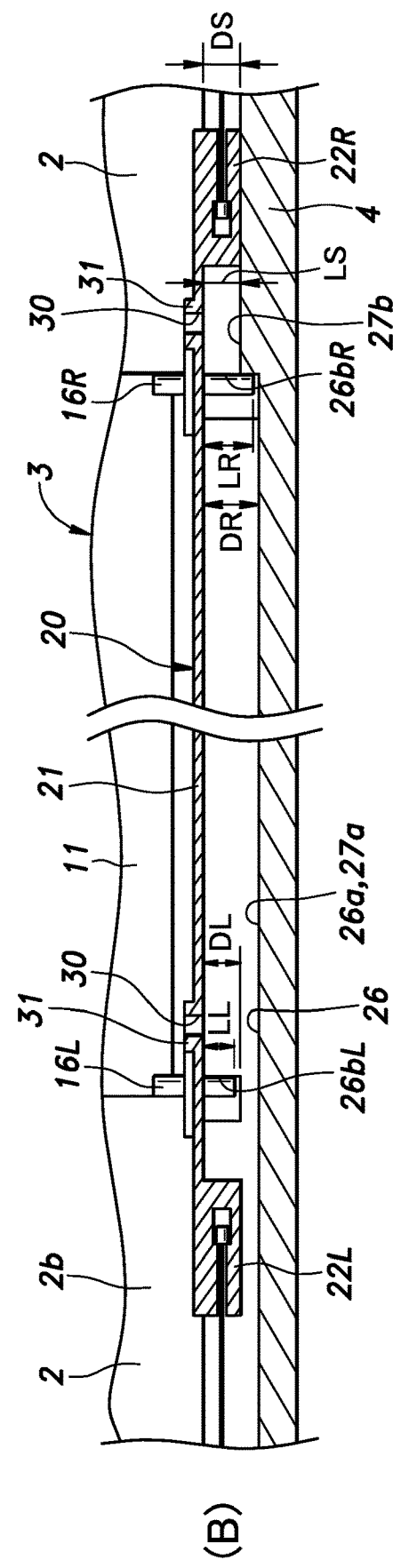

FIG. 5 is an exploded view of a part indicated by V in FIG. 1, and FIG. 6 is an enlarged view of the part indicated by V in FIG. 1. Note that in FIG. 5 and FIG. 6, the cover frame 15 is omitted. FIG. 7 shows (A) a sectional plan view and (B) a sectional vertical view (sectional view taken along line B-B in (A) of FIG. 7) of the power slide window 1 in the closed state. As shown in FIG. 5 and (A) of FIG. 7, the upper surface of the guide rail 4 (the surface facing the upper guide rail 4) is provided with a pin guide groove 26 configured to receive and guide the pins 16 and a slider guide groove 27 configured to slidably receive the left and right sliding members 22L, 22R of the slider 20.

The pin guide groove 26 includes a groove main portion 26a extending laterally along the guide rail 4. A right groove extension portion 26bR extends continuously from the right end of the groove main portion 26a obliquely in a right rear direction. The right groove extension portion 26bR is curved toward the rear as it extends rightward. A left groove extension portion 26bL extends continuously from a laterally intermediate part of the groove main portion 26a obliquely in a right rear direction. The left groove extension portion 26bL also is curved to the rear as it extends rightward. The right groove extension portion 26bR and the left groove extension portion 26bL are inclined relative to the longitudinal direction of the guide rail 4 and are substantially identical in shape in plan view. However, since the left groove extension portion 26bL extends rearward from the intermediate part of the groove main portion 26a, the left groove extension portion 26bL is shorter than the right groove extension portion 26bR by the amount of overlap with the groove main portion 26a.

The slider guide groove 27 extends laterally along the guide rail 4, is formed to have the same width as that of the groove main portion 26a of the pin guide groove 26, and is arranged at a position overlapping with the groove main portion 26a in the fore and aft direction. Namely, the slider guide groove 27 and the groove main portion 26a of the pin guide groove 26 are formed in common with each other at longitudinally overlapping portions thereof. The slider guide groove 27 is provided with a common groove portion 27a formed in common with the groove main portion 26a of the pin guide groove 26 and a right slider-dedicated groove portion 27b that extends rightward (in the direction of extension of the groove main portion 26a) beyond the right end (or the end portion on the side of the closed position) of the groove main portion 26a. Note that in the present embodiment, the cable 10 also extends from the slider 20 leftward, and therefore, the slider guide groove 27 further includes a left slider-dedicated groove portion 27b (see FIG. 3) that extends leftward (in the direction of extension of the groove main portion 26a) beyond the left end (or the end portion on the side of the open position) of the groove main portion 26a.

As shown in FIG. 5, the sliding member 22 includes a projecting portion 28 projecting into the slider guide groove 27 and a pair of flange portions 29 integrally formed at the upper end of the projecting portion 28 so as to project in the fore and aft direction. The pair of flange portions 29 is formed to be larger than the width of the slider guide groove 27, and slidably contacts the upper surface of the guide rail 4 outside the slider guide groove 27. Thereby, only the projecting portion 28 of the sliding member 22 is received in the slider guide groove 27.

As shown in (A) of FIG. 7, the main plate member 21 of the slider 20 is formed with left and right pin drive grooves 30 through which the corresponding left and right pins 16 project into the pin guide groove 26. Note that to reduce the sliding resistance of the pins 16, a resin member 31 covering the sliding contact part of the pin drive groove 30 is integrally formed on the main plate member 21 by outsert molding. Each pin drive groove 30 is a groove for engaging the corresponding pin 16 to drive the pin 16, and extends in a direction crossing the panel surface 2b to permit the movement of the pin 16 in the direction crossing the panel surface 2b. Also, each pin drive groove 30 extends substantially in the fore and aft direction in the front part of the main plate member 21 and is curved leftward toward the rear (in other words, is curved such that the inclination angle thereof with respect to the fore and aft direction progressively increases toward the rear). In the rear part of the main plate member 21, each pin drive groove 30 extends substantially linearly at a relatively small inclination angle relative to the direction of extension of the groove main portion 26a. Namely, the pin drive groove 30 is inclined relative to the direction of extension of the groove main portion 26a in a direction to be spaced further from the window glass pane 2 as it extends from the left to the right, and also extends at an angle both to the fore and aft direction, which is a direction orthogonal to the panel surface 2b of the window glass pane 2, and to the lateral direction, which is the direction of extension of the groove main portion 26a. In the state shown in FIG. 6 and (A) of FIG. 7 or when the slide panel 3 is in the closed position, the right pin 16 is positioned in a rear part (left end vicinity) of the pin drive groove 30 and at the right end of the pin guide groove 26 (the rear end of the groove extension portion 26b).

As shown in FIG. 5, the pin 16 is inserted into the pin guide groove 26 by passing through the pin drive groove 30 of the main plate member 21. Namely, as is also shown in FIG. 6, the pin 16 arranged in such a state is fixed to the slide panel 3 by screwing the pin bracket 17 to the bracket frame 13. The lower right cable 10 (FIG. 5) extends rightward from the right sliding member 22R of the slider 20.

Similarly, as shown in FIG. 3, the lower left cable 10 extends leftward from the left end of the slider 20, the upper left cable 10 extends leftward from the left end of the upper slider 20, and the upper right cable 10 extends rightward from the right end of the upper slider 20.

As shown in FIG. 6, the right stopper 23 is provided in the right slider-dedicated groove portion 27b and is attached to the guide rail 4 by a position adjustment structure 32 so as to be position-adjustable in the direction of extension of the slider-dedicated groove portion 27b. The position adjustment structure 32 will be described in detail later. The stopper 23 includes a stopper main body 24 consisting of a resin injection-molded product and a cushioning member 25 made of an elastic material such as rubber and provided at the slider 20-side end portion (opening direction end) of the stopper main body 24. The part of the slider guide groove 27 to the right of the stopper 23 receives the guide pipe 9 (see FIG. 3). The stopper 23 has an inverted U-shaped cross section to define a cable insertion groove 23a (see FIG. 9) that is open toward the bottom surface of the slider guide groove 27 such that the cable 10 can be inserted therein. The lower right cable 10 extending out from the free end of the guide pipe 9 extends to the right sliding member 22R via the cable insertion groove 23a formed in the right stopper 23. The end portion of the cable 10 is held by the right sliding member 22R.

As shown in (B) of FIG. 7, the groove main portion 26a of the pin guide groove 26 is formed with a constant depth. The left groove extension portion 26bL is formed shallower than the groove main portion 26a, the right groove extension portion 26bR is formed to have the same depth as that of the groove main portion 26a. Namely, the left groove extension portion 26bL is formed shallower than the right groove extension portion 26bR. Also, the slider-dedicated groove portion 27b is formed shallower than the groove main portion 26a of the pin guide groove 26.

The depths D of the slider-dedicated groove portion 27b and the pin guide groove 26 and the projection length L of each pin 16 into the pin guide groove 26 are determined to satisfy the following relationship. Namely, the projection length LL of the lower left pin 16L is smaller than the depth DL of the left groove extension portion 26bL, and the projection length LR of the lower right pin 16R is larger than the depth DL of the left groove extension portion 26bL and the depth DS of the slider-dedicated groove portion 27b and smaller than the depth DR of the right groove extension portion 26bR. That is, the following formulae (1) and (2) hold:

$$LL<DL \quad (1)$$

$$DL, DS<LR<DR \quad (2)$$

As a result, the lower left pin 16L can advance into the left groove extension portion 26bL, while the lower right pin 16R cannot advance into the left groove extension portion 26bL and the slider-dedicated groove portion 27b but can advance into the right groove extension portion 26bR. The same relationship holds with regard to the projection length L of each upper pin 16 and the depths D of the corresponding slider-dedicated groove portion 27b and pin guide groove 26.

As shown in (B) of FIG. 7, the depths D of the slider-dedicated groove portion 27b and the pin guide groove 26 and the projection length LS of the slider 20 (the sliding member 22) into the pin guide groove 26 are determined to satisfy the following relationship. That is, the depth DS of the slider-dedicated groove portion 27b is larger than the projection length LS of the slider 20 and smaller than the depth of the groove main portion 26a (or the depth DR of the right groove extension portion 26bR). Namely, the following formula (3) holds:

$$LS<DS<DR \quad (3)$$

Thereby, the slider 20 can slide in the slider-dedicated groove portion 27b and the groove main portion 26a of the pin guide groove 26, and is prevented from being engaged by a step portion when advancing into the slider-dedicated groove portion 27b from the groove main portion 26a.

As described above, the lower cable 10 on the right side and the lower cable 10 on the left side which are wound on and unwound from the same pulley in a complemental manner constitute a lower drive cable that slidingly drives the lower portion of the slide panel 3. Similarly, the upper cable 10 on the right side and the upper cable 10 on the left side which are wound on and unwound from the same pulley in a complemental manner constitute an upper drive cable that slidingly drives the upper portion of the slide panel 3.

Figure 8:
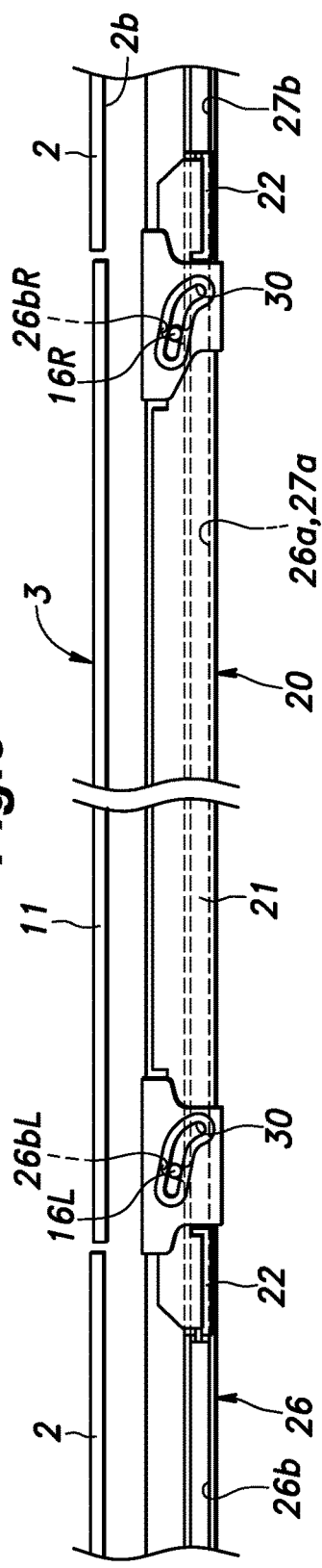
FIG. 8 is a plan view for explaining opening and closing movement of the power slide window.
Figure 8:
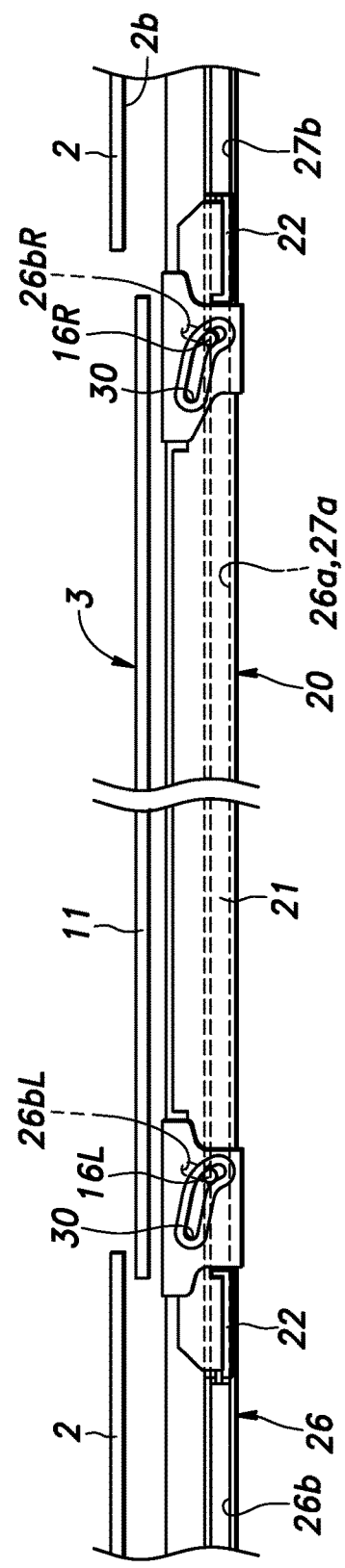
Figure 8:
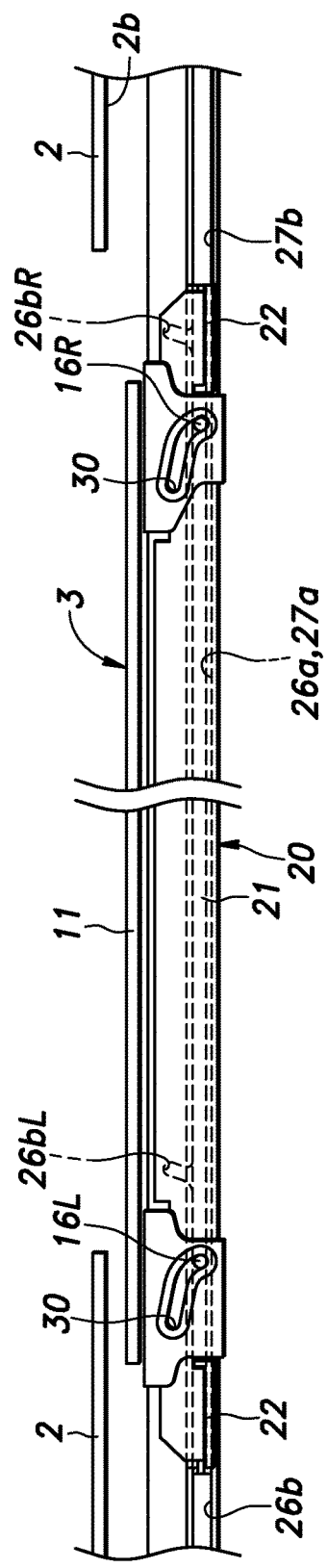

FIG. 8 is a plan view for explaining the opening and closing operation of the power slide window 1, in which (A) shows the state where the slide panel 3 is in the closed position, (B) shows the state where the slide panel 3 is substantially in front of the closed position, and (C) shows the state where the slide panel 3 is in front of and to the left of the closed position. When the slide panel 3 is to be opened, the state of the power slide window 1 progresses from (A) to (C) of FIG. 8. Conversely, when the slide panel 3 is to be closed, the state of the power slide window 1 progresses from (C) to (A) of FIG. 8.

As shown in (A) of FIG. 8, when the slide panel 3 is in the closed position and flush with the window glass pane 2, the pins 16 (16L and 16R) are each positioned in the rear portion (left end vicinity) of the corresponding pin drive groove 30 of the main plate member 21 and are each positioned at the rear end of the corresponding groove extension portion 26b of the pin guide groove 26. Under this condition, when the cables 10 are complementarily wound and unwound in the leftward direction and the slider 20 is slidingly driven to the left, the state shown in (B) of FIG. 8 is achieved. At this time, the left and right pins 16 are driven forward by the slider 20 along the respective pin drive grooves 30, and are moved forward and leftward along the respective groove extension portions 26b of the pin guide groove 26. As a result, the entire slide panel 3 undergoes a sliding movement such that the slide panel 3 moves initially forward or in the direction away from the window glass pane 2 and then leftward or in the direction parallel with the panel surface 2b while maintaining an attitude in parallel with the window glass pane 2. In the state shown in (B) of FIG. 8, the rear surface of the movable glass pane 11 is positioned ahead of the panel surface 2b of the window glass pane 2.

Thereafter, when the cables 10 are complementarily wound and unwound further in the leftward direction and the slider 20 is slid to the left, the state shown in (C) of FIG. 8 is achieved. At this time, the left and right pins 16 move to the left along the pin guide groove 26 while being positioned at the front ends of the corresponding pin drive grooves 30. As a result, the entire slide panel 3 slides to the left. In this way, by forming the pin drive groove 30 elongated in the fore and aft direction in the main plate member 21, the slide panel 3 can be caused to slide in the fore and aft direction without changing the positions of the slider 20 and the cables 10 in the fore and aft direction.

The open position of the slide panel 3 is defined as the position at which the opening 2a of the window glass pane 2 is entirely opened up as shown in FIG. 2. When the slide panel 3 is in the open position, the right pin 16R is positioned in a part of the groove main portion 26a located to the left of the left groove extension portion 26bL.

When the slide panel 3 is in the open position, by causing the cables 10 to be complementarily wound and unwound in the rightward direction, the slider 20 is slidingly driven to the right. At this time, the slide panel 3 slides rightward from the fully open position and, when reaching the vicinity of the closed position via the states shown in (C) of FIG. 8 and (B) of FIG. 8, is driven via the pin 16 in the direction to approach the window glass pane 2 so that the closed position shown in (A) of FIG. 8 is restored.

As was explained with reference to (B) of FIG. 7, the projection length LR of the right pin 16R is larger than the depth DL of the left groove extension portion 26bL. Therefore, when the right pin 16R passes the branching part (adjacent to the left groove extension portion 26bL) between the groove main portion 26a and the left groove extension portion 26bL during the movement of the slide panel 3 to the closed position, the right pin 16R is prevented from advancing into the left groove extension portion 26bL.

Also, as described above, the projection length LR of the right pin 16R is larger than the depth DS of the slider-dedicated groove portion 27b. Therefore, when the right pin 16R passes the branching part between the slider-dedicated groove portion 27b and the right groove extension portion 26bR during the movement of the slide panel 3 to the closed position, the right pin 16R is prevented from advancing into the slider-dedicated groove portion 27b.

Figure 9:
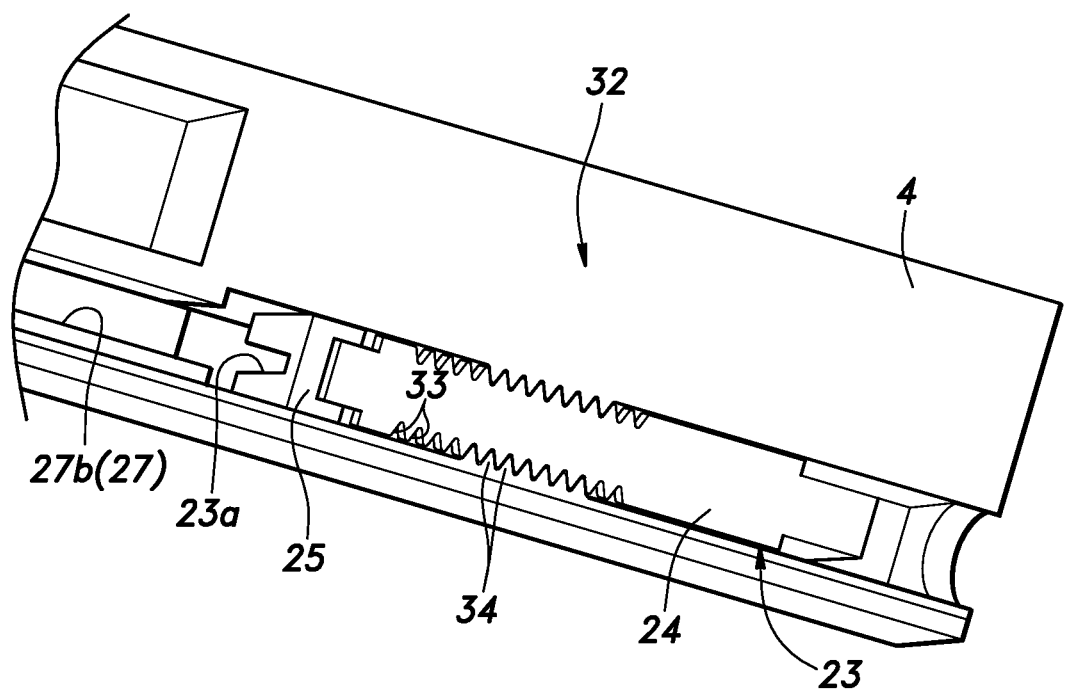
FIG. 9 is an enlarged view of the position adjustment structure shown in FIG. 6.

As described above, in the power slide window 1 of the present embodiment, as the pins 16 move in the groove extension portions 26b, the slide panel 3 is slidingly driven in a direction crossing the panel surface 2b of the window glass pane 2, as shown in (A) and (B) of FIG. 9. As the pins 16 move in the groove main portion 26a shown in (B) and (C) of FIG. 9, the slide panel 3 is slidingly driven in a direction along the panel surface 2b of the guide rail 4. Owing to these actions, the slide panel 3 is enabled to smoothly slide between the closed position and the open position to close and open the opening 2a.

FIG. 9 is an enlarged view of the position adjustment structure 32 shown in FIG. 6. As shown in FIG. 9, the stopper main body 24 is formed on both side surfaces thereof with multiple engagement recesses 33 arranged in the longitudinal direction of the guide rail 4 at a prescribed interval. The slider guide groove 27 is formed on both side surfaces thereof with engagement protrusions 34 that are integral with the guide rail 4 and arranged in the longitudinal direction of the guide rail 4 at the same interval as that of the engagement recesses 33, where the number of engagement protrusions 34 is smaller than the number of engagement recesses 33. The engagement protrusions 34 have a shape complemental to that of the engagement recesses 33 and are received in the engagement recesses 33 to engage the stopper 23. In this way, the stopper 23 is attached to the guide rail 4 to be unmovable in the longitudinal direction of the guide rail 4.

The number of engagement protrusions 34 is only required to be one or more, and may be plural. Since a larger number of engagement recesses 33 than the number of engagement protrusions 34 are formed, it is possible to fit the stopper 23 in the slider guide groove 27 at a desired position in the longitudinal direction of the guide rail 4. As described, the position adjustment structure 32 includes the engagement recesses 33 and the engagement protrusions 34. Therefore, it is possible to easily adjust the position of the stopper 23 by removing and inserting the stopper 23 from and into the slider guide groove 27, and inadvertent move of the stopper 23 in the slider guide groove 27 can be suppressed. Further, the position adjustment structure 32 can be easily formed by simply forming the engagement recesses 33 and the engagement protrusions 34 on the stopper 23 and the guide rail 4.

In another embodiment, the stopper main body 24 may be formed on both side surfaces thereof with at least one engagement protrusions 34, and the slider guide groove 27 may be formed on both side surfaces thereof with a larger number of engagement recesses 33 than the number of engagement protrusion(s) 34. Alternatively, the engagement recesses 33 and the engagement protrusions 34 may be formed on only one side surface of the stopper main body 24 and the slider guide groove 27, respectively. Furthermore, it is also possible to form the engagement recesses 33 and the engagement protrusions 34 on the bottom surface of the stopper main body 24 (free end surfaces of the legs of the inverted U-shape) and the bottom surface of the slider guide groove 27 so that these constitute the position adjustment structure 32.

Figure 10:
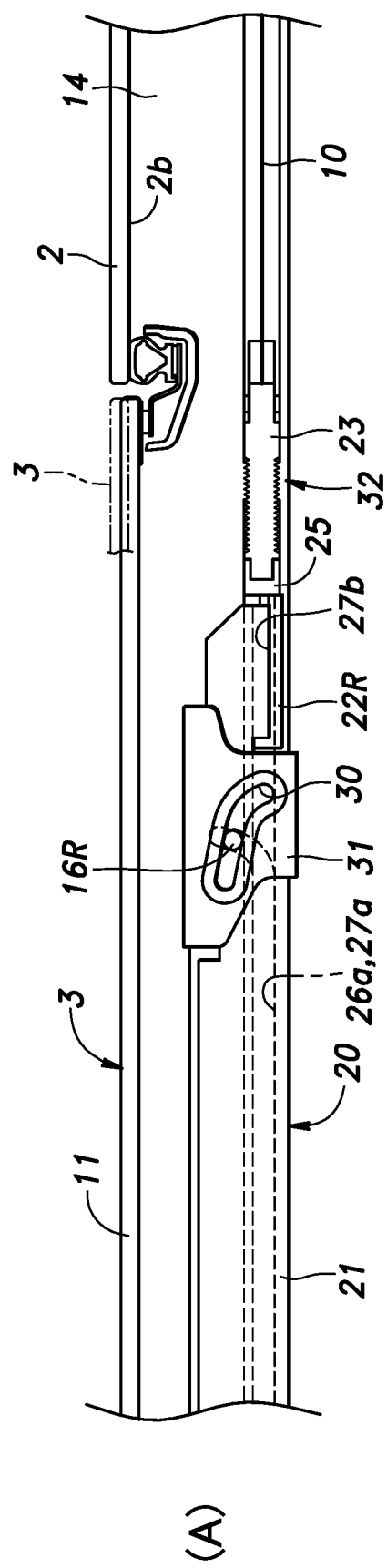
FIG. 10 is a diagram illustrating position adjustment of the slide panel in accordance with the position of the stopper.
Figure 10:
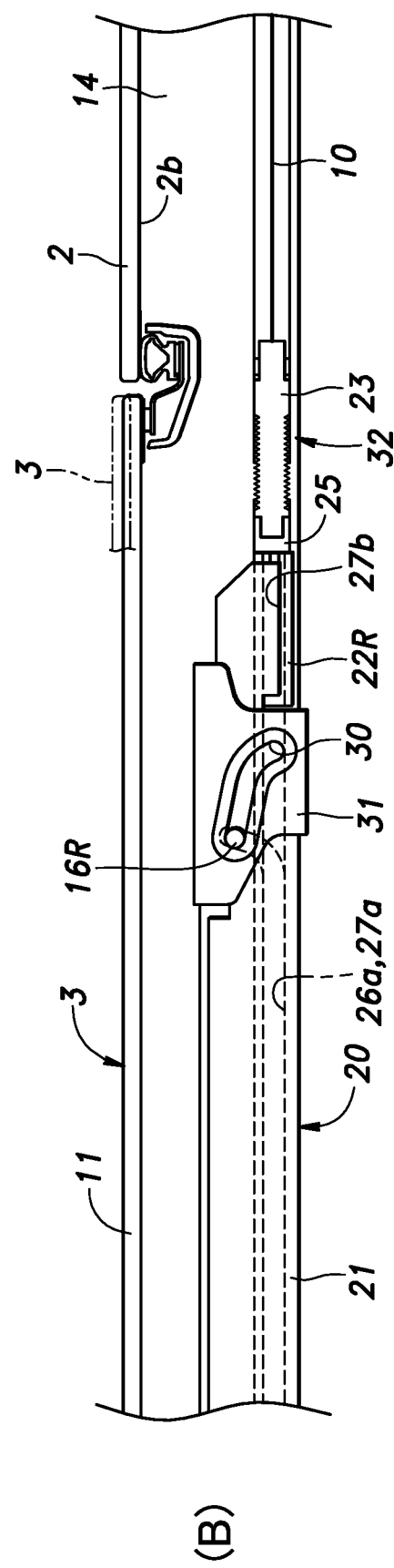

FIG. 10 is a diagram illustrating the position adjustment of the slide panel 3 in accordance with the position of the stopper 23. In (A) of FIG. 10, the stopper 23 is attached to the guide rail 4 at a position close to the slider 20 (on the opening direction side), and in (B) of FIG. 10, the stopper 23 is attached to the guide rail 4 at a position remote from the slider 20 (on the closing direction side). As shown in (A) of FIG. 10, in this state, the pin 16 is positioned forward (rightward) of the rear end (left end) of the pin drive groove 30 and the slide panel 3 is positioned forward of the window glass pane 2 so that a step is created therebetween.

In such a case, by adjusting the position of the stopper 23 in the opening direction or in the direction away from the slider 20 by using the position adjustment structure 32 as shown in (B) of FIG. 10, the pin 16 is shifted toward the rear end (left end) of the pin drive groove 30 and the slide panel 3 also is shifted rearward (upward in FIG. 10) in the closed state in which the slider 20 contacts the stopper 23, whereby the step between the slide panel 3 and the window glass pane 2 is eliminated.

Conversely, in a case where the slide panel 3 is positioned rearward of the window glass pane 2 in this state so that a step is created therebetween as shown by an imaginary line in (B) of FIG. 10, the position of the stopper 23 is adjusted to the position shown in (A) of FIG. 10. Thereby, as shown by an imaginary line in (A) of FIG. 10, the step between the slide panel 3 and the window glass pane 2 is eliminated. By adjusting the position of the stopper 23 in this way, the position of the slide panel 3 in the closed state can be adjusted in the fore and aft direction.

As described above, in the power slide window 1 according to the embodiment, the pin drive groove 30 extends in a direction inclined to the direction of extension of the groove main portion 26a, and the position of the stopper 23 is adjustable owing to the position adjustment structure 32. Therefore, it is possible to limit the movement of the slider 20 toward the closed position at a position where the slide panel 3 aligns with the window glass pane 2. Thereby, irrespective of the assembly accuracy, a step formed between the slide panel 3 and the window glass pane 2 in the closed state can be minimized. Specifically, even if the assembly accuracy of the pin 16 relative to the slide panel 3 and the assembly accuracy of the guide rail 4 (the pin guide groove 26) relative to the window glass pane 2 are low, it is possible to reduce the step between the slide panel 3 and the window glass pane 2 by adjusting the position of the stopper 23.

Although the present invention has been described in terms of a concrete embodiment, the present invention is not limited to the above-described embodiment, but can be modified in various ways. For example, the power slide window 1 was applied to the rear window of a pickup truck as an example in the above embodiment, but may also be applied to a rear window or a side window of a minivan or the like. Also, the various structures, positions, numbers and angles of the various members and portions may be freely modified without departing from the spirit of the present invention. The various components of the illustrated embodiment are not necessarily essential for the present invention, but can be selectively omitted without departing from the spirit of the present invention.

GLOSSARY 1 power slide window
2 window glass pane
2*a* opening
2*b* panel surface
3 slide panel
4 guide rail
5 drive source
16 pin
16L left pin
16R right pin
20 slider
26 pin guide groove
26*a* groove main portion
26*b*L left groove extension portion
26*b*R right groove extension portion
27 slider guide groove
30 pin drive groove
32 position adjustment structure
33 engagement recess
34 engagement protrusion

The invention claimed is:

1. A power slide window for opening and closing an opening provided in a window glass pane with a slide panel, the power slide window comprising:
 a guide rail provided on the window glass pane along a panel surface of the window glass pane;
 at least one pin projecting from the slide panel along the panel surface in a direction crossing a longitudinal direction of the guide rail;
 a pin guide groove formed in the guide rail to receive the at least one pin, the pin guide groove including a groove main portion extending along the panel surface in an opening and closing direction and at least one groove extension portion extending from the groove main portion to drive the slide panel in a direction to approach the window glass pane via the at least one pin when the slide panel reaches a vicinity of a closed position;
 a slider slidably provided in a slider guide groove formed in the guide rail and slidingly driven by a drive source in the opening and closing direction;
 at least one pin drive groove that is formed in the slider to engage the at least one pin, extends in a direction crossing the panel surface; and is inclined over an entire length thereof at an inclination angle with respect to a direction of extension of the groove main portion;
 a stopper provided in the slider guide groove to limit a movement of the slider toward the closed position; and
 a position adjustment structure capable of adjusting a position of the stopper in a direction of extension of the slider guide groove.

2. The power slide window according to claim 1, wherein the position adjustment structure includes at least one engagement recess formed on a side surface of one of the slider guide groove and the stopper at a prescribed interval in the longitudinal direction of the guide rail and at least one engagement protrusion formed on a side surface of the other of the slider guide groove and the stopper to engage the engagement recess, and is configured to be capable of attaching the stopper to the guide rail at multiple different positions in the direction of extension of the slider guide groove by engagement between the engagement recess and the engagement protrusion.

3. The power slide window according to claim 2, wherein the pin drive groove is curved such that inclination angle with respect to the direction of extension of the groove main portion progressively increases in a direction away from the window glass pane.

4. The power slide window according to claim 1, wherein the pin drive groove is curved such that the inclination angle with respect to the direction of extension of the groove main portion progressively increases in a direction away from the window glass pane.

* * * * *